United States Patent [19]

Piper

[11] Patent Number: 4,945,545
[45] Date of Patent: Jul. 31, 1990

[54] COLD ELECTRODE METAL VAPOR LASER

[75] Inventor: James A. Piper, Sydney, Australia

[73] Assignee: Metalaser PTY, Australia

[21] Appl. No.: 165,985

[22] PCT Filed: Feb. 18, 1987

[86] PCT No.: PCT/AU87/00045

§ 371 Date: Nov. 25, 1987

§ 102(e) Date: Nov. 25, 1987

[87] PCT Pub. No.: WO87/05159

PCT Pub. Date: Aug. 27, 1987

[30] Foreign Application Priority Data

Feb. 18, 1986 [AU] Australia ............................. PH4674

[51] Int. Cl.$^5$ ............................ H01S 3/097; H01S 3/22
[52] U.S. Cl. ......................................... 372/87; 372/56; 372/61; 372/62; 372/85; 372/88
[58] Field of Search ..................... 372/87, 56, 55, 61, 372/62, 76, 85, 86, 74, 88; 313/546, 547, 549, 550, 551, 566, 346 R

[56] References Cited

U.S. PATENT DOCUMENTS

| 3,548,335 | 12/1970 | Willett | 372/85 |
| 3,868,593 | 2/1975 | Fukuda et al. | 372/62 |
| 4,257,014 | 3/1981 | Hattori et al. | 372/88 |
| 4,696,011 | 9/1987 | Kearsley | 372/61 |
| 4,771,435 | 9/1987 | Tobin et al. | 372/61 |

Primary Examiner—William L. Sikes
Assistant Examiner—Georgia Y. Epps

[57] ABSTRACT

A metal vapor laser intended to be excited by an electrical discharge pulsed through a metal vapor, consisting of a tubular chamber terminated at each end by a terminating flange, the terminating flange (1) having formed integrally with it a cold cathode structure having associated with it a multiplicity of electron generating devices (10, 11, 12) for non-thermionic generation of electrons. The electron generating devices (10, 11, 12) consist preferably of a series of annular grooves (10) formed in the surface of a bore of the terminating flange (1) and a circular groove or grooves (11) coaxial with the axis of the laser and cut in to a face of the terminating flange (1) facing directly into the discharge volume (8). Additionally, to increase carrying capability and facility for easily striking the discharge there is provide a ring of refractory metal pins (12) fixed into that surface of the terminating flange (1).

4 Claims, 2 Drawing Sheets

COLD ELECTRODE METAL VAPOR LASER

This invention relates to lasers and has particular application to lasers of a type wherein a metal vapour is excited by an electrical discharge pulsed through a metal vapour.

Pulsed metal vapour lasers are potentially very efficient generators of ultra violet, visible and infrared radiation. This radiation has applications in areas as diverse as laser isotope separation, with copper as the lasant, communications, with manganese as the lasant, treatment of cancer by photochemotherapy, with gold as the lasant and photochemical research, with strontiums as the lasant.

Pulsed metal vapour lasers generally comprise two electrodes between which there is a column of gas known as the discharge volume The electrodes are attached to terminating flanges that provide gas containment at either end of the volume Initially, the discharge volume contains a buffer gas and beads of a metal. The application of a fast high voltage pulse to the discharge volume produces a high current (hundreds of thousands of amperes) discharge pulse which heats the gas and the electrodes and thereby transfer heat to the inner walls of the chamber which substantially confine the active volume The walls of the chamber, the electrodes and the metal therein are heated and with repeated discharges, and with appropriate insulation, the temperature may rise sufficiently to melt and vapourise the metal. The resultant metal vapour may be excited by collisions with the stream of electrons and other discharge constituents and, under certain circumstances, laser action may occur This class of laser is well known in the art.

Hitherto, the technique generally employed for the transfer of electrical energy to the discharge volume has been to use tubular, co-axial electrodes located at, or adjacent to, the ends of the walls of the chamber. The electrodes operate at high temperatures and thermionic emission of electrons sustains the discharge for the duration of the current pulse. Since the electrodes are required to operate at temperatures of up to 2000 degrees centigrade, they are generally constructed from a refractory metallic material, such as tantalum, molybdeneum or tungsten. The electrodes are attached to the terminating flanges of the laser by a variety of mechanical techniques and electrical energy is transferred to the electrodes through the terminating flanges.

This technique of electrode construction has several disadvantages. The major disadvantage is that suitable materials are rare and consequently expensive whilst the refractory properties which make the materials suitable for use at elevated temperatures also make the materials brittle and difficult to fabricate into the desired shape.

Another disadvantage resulting from the elevated operating temperature is the removal of material from the electrode surface and subsequent redeposition on the walls of the vessel. This transfer of material to the walls is caused by both thermal evaporation and sputtering that is enhanced by the reduced resistance of the material to discharge induced erosion at high temperatures. Such material removal gradually destroys the function of the electrode, captures gas from the discharge volume and deposits metal on the walls of the vessel in positions that may be deleterious to the voltage holdoff requirement of the laser. This, and the embritlement that accompanies high temperature operation, necessitates the periodic replacement of the electrodes, resulting in the need for a demountable structure. Such a structure necessarily includes a junction that exhibits less than desirable thermal and electrical energy transfer characteristics and is sensitive to degradation of these transfer characteristics by the differential expansion and contraction which accompanies the thermal cycling.

Another disadvantage is that energy is isotropically radiated away from the surface of the electrode. This requires thermally sensitive components, located in close proximity to the terminating flange, to be shielded from the deleterious effects of the radiation.

The present invention consists in a pulsed metal vapour laser having an optical resonator cavity and a discharge volume for amplifying stimulated emission, such volume defined by a tubular chamber the ends of which are closed by terminating flanges characterized in that there is formed integrally with a flange a single cold cathode structure having a plurality of efficient non-thermionic electron generating means to sustain a high current pulsed discharge in the discharge volume of the laser upon application of a high-voltage electrical pulse between the terminating flanges of the tube.

It has been found that the construction of a metal vapour laser tube can be significantly simplified by the use of a cold cathode structure that is integral to the terminating flange and provides for a multiplicity of electron generating means with which to sustain the discharge. In a preferred form of the invention the cold cathode structure and integral terminating flange are machined, using conventional turning techniques, from a single piece of metal. Grooves, machined on the inner surface of the terminating flange, transverse to the tube axis and co-axial with it, and of dimensions suitable for obtaining electrons at a wide range of buffer gas pressure via the hollow cathode effect, are cut into the surface of the terminating flange. Another series of grooves are cut into the surface of the terminating flange directly facing the discharge volume. This provides a means for generating electrons via the hollow cathode effect, increases the surface area of the electrode and ensures that the discharge does not run to areas of the terminating flange where its effect could be deleterious. Additional discharge carrying capability and facility for easily striking the discharge upon application of a high voltage electrical pulse is provided by a ring of refractory metal pins fixed into the electrode face. With the multiplicity of electron generating means described above, the discharge is not required to obtain electrons from the uncoated metal surfaces of the terminating flange under any observed operating conditions, and discharge induced sputtering is reduced to an acceptable level.

Typically, the terminating flanges are composed of an easily machined metal such as aluminium and the refractory metal pins are composed of tungsten. However, for different metal vapour lasers, materials such as stainless steel may be preferable.

There are numerous advantages to be derived from the above system with the most notable being the reduction in complexity and production cost, coupled with an increase in terminating flange lifetime, of a metal vapour laser constructed in this manner. Not only is the terminating flange simpler and less costly to produce but the reduced incidence of sputtering resulting from the cold operating mode of the electrodes results in a laser with increased longevity. This enables such a laser to be commercially offered on a replacement, rather than refurbishment, basis.

Another advantage is the elimination of the thermal and electrical junction that exists between electrode and terminating flange in a conventional metal vapour laser. This eliminates the possibility of electrode failure caused by overheating as a result of thermal cycling induced breakdown of the junction between terminating flange and electrode. The only discharge related sub-components jointed to the terminating flange in a cold cathode structure of the type described herein are the refractory pins fixed into the terminating flange face. However, as these pins do not generally carry a significant fraction of the discharge energy, are thermally well connected to the cold terminating flange and are multiply disposed so as to reduce the amount of discharge that is carried by any individual pin, the operating temperature of the pins is not significantly above that of the terminating flange and the deleterious effects of such a function are minimized.

The invention can be better understood by reference to a preferred embodiment which will now be described with reference to the accompanying diagrams in which.

Figure 1:
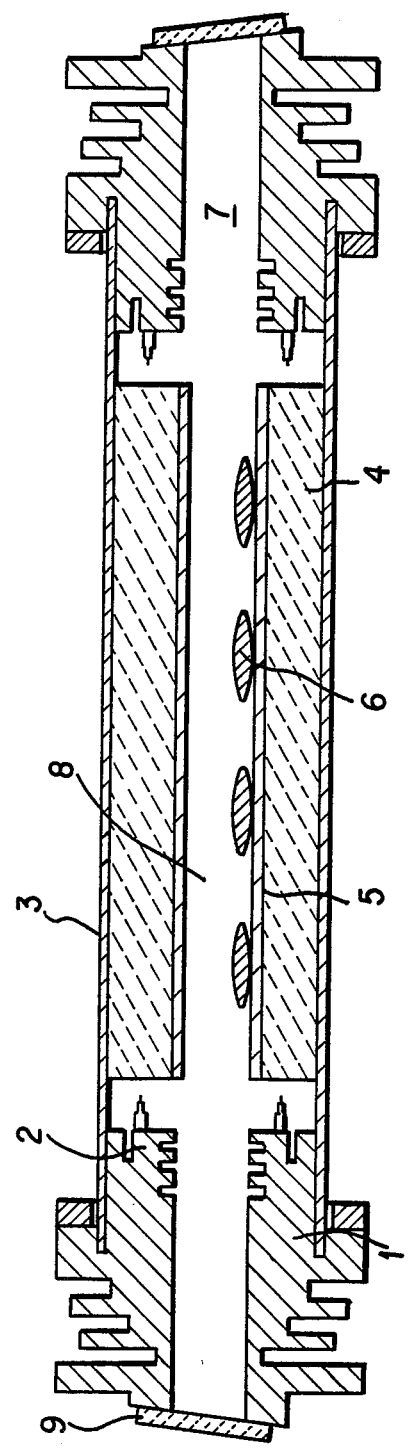
FIG. 1 is a longitudinal median cross-sectional view of a metal vapour laser tube constructed according to the invention.

Referring in more detail to FIG. 1, terminating flange 1, window 9 and tube 3 define the gas chamber 7. Electrode components 2 of terminating flanges 1 provide the ends to the discharge volume 8. Thermal insulation 4 is provided in order to raise the temperature of metal beads 6 to the optimum temperature for lasing action. The tube 5 is supported co-axially with the thermal insulation, or, in the case of a laser without internal thermal insulation and a "tube within a tube" structure, becomes the gas chamber defining tube 3. The former is appropriate to a copper laser and the latter to a lower operating temperature device like a strontium laser.

The tube defining the gas chamber is sealed against the terminating flanges via O-rings or some other suitable sealing technique. The whole assembly is connected to suitable power supplies, vacuum systems and cooling systems. These are all common in the art and do not form part of this invention.

Figure 2:
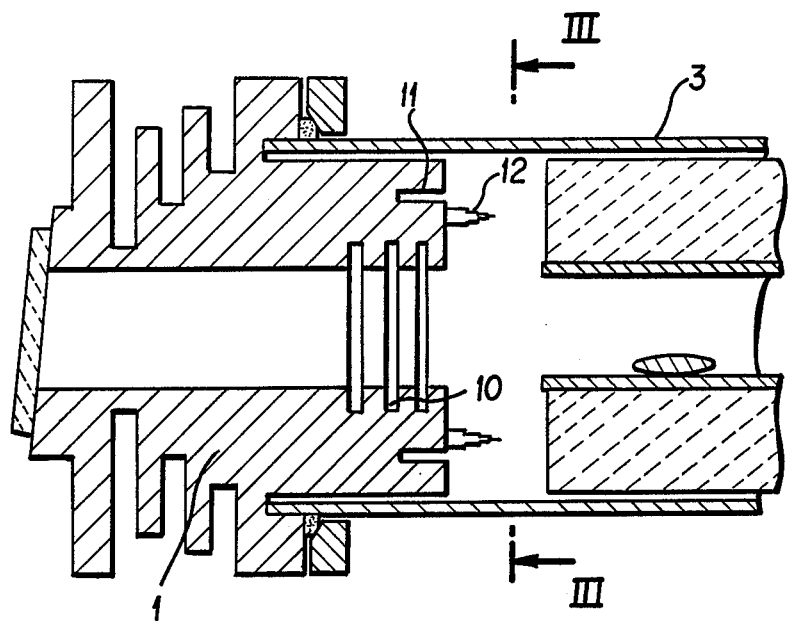
FIG. 2 is a cross-sectional view to an enlarged scale of electrode assembly and terminating flange at one end of the tube.

FIG. 2 shows a cross-sectional view of the integral terminating flange and electrode structure and details the multiplicity of electron generating means described herein. A ring of refractory metal pins 12 provide for an electron generating means via a high field gradient on the tips of the pins. This provides a means of easily initiating the discharge and of maintaining the discharge under some operating conditions. The grooves 10, machined on the inner diameter of the terminating flange, transverse to the tube axis and co-axial with it, provide electrons via the hollow cathode effect. The width of the grooves is varied to provide for the maximum effect over a wide range of buffer gas operating pressures and compositions. The concentric groove 11 increases the surface area of the electrode and provides electrons via the hollow cathode effect. The groove is also effective in preventing the discharge from wandering to parts cf the terminating flange not designed for electrode operation.

Figure 3:
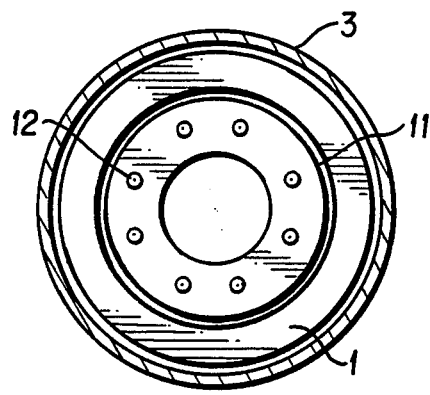
FIG. 3 is a cross-sectional view on line 3—3 of FIG. 2.

FIG. 3 shows a plan view of the face of the electrode facing the discharge volume and details the ring of refractory metal pins described above.

It will be appreciated that alterations can be made with respect to the preferred embodiment within the scope of the succeeding claims.

I claim:

1. A pulsed metal vapor laser having an optical resonator cavity and a discharge volume for amplifying stimulated emissions, wherein said discharge volume is defined by a tubular chamber the ends of which are closed by terminating flanges characterized in that there is formed integrally with a flange only a single cold cathode structure having a plurality of means for non-thermionic electron generation to sustain a high current, pulsed discharge in the discharge volume of the laser upon application of a high voltage electrical pulse between the terminating flanges of the tube.

2. A pulsed metal vapour laser as claimed in claim 1, wherein said means for non-thermionic electron generation include a number of grooves of differing widths formed in surfaces of the cold cathode structure and arranged to generate electrons by the hollow cathode effect.

3. A pulsed metal vapour laser as claimed in claim 2, wherein a plurality of said grooves are formed in an axial bore of the cold electrode structure and at least one groove in a face thereof directed towards the discharge volume.

4. A pulsed metal vapour laser as claimed in claim 2 or claim 3, including a ring of refractory pins arranged in a face of the cold cathode structure facing the discharge volume arranged to facilitate initiation of the discharge therein.

* * * * *